(12) United States Patent
Jeffrey et al.

(10) Patent No.: US 7,460,136 B2
(45) Date of Patent: Dec. 2, 2008

(54) EFFICIENT SCALING OF IMAGE DATA IN GRAPHICS DISPLAY SYSTEMS

(75) Inventors: Eric Jeffrey, Richmond (CA); George Lyons, Langley (CA)

(73) Assignee: Seiko Epson Corporation, Tokyo (JP)

( * ) Notice: Subject to any disclaimer, the term of this patent is extended or adjusted under 35 U.S.C. 154(b) by 312 days.

(21) Appl. No.: 11/207,394

(22) Filed: Aug. 19, 2005

(65) Prior Publication Data

US 2007/0040838 A1 Feb. 22, 2007

(51) Int. Cl.
*G09G 5/00* (2006.01)

(52) U.S. Cl. ............... 345/660; 345/665; 345/668; 345/670

(58) Field of Classification Search .......... 345/520, 345/648, 660, 665, 668, 670, 472
See application file for complete search history.

(56) References Cited

U.S. PATENT DOCUMENTS 5,874,937 A * 2/1999 Kesatoshi ............... 345/428

2006/0028564 A1 * 2/2006 Baer ..................... 348/294

* cited by examiner

*Primary Examiner*—Kee M Tung
*Assistant Examiner*—Hau H Nguyen
(74) *Attorney, Agent, or Firm*—Mark P. Watson

(57) ABSTRACT

In a preferred embodiment, a system includes a host, an image data source, and a graphics controller. The image data source provides a frame corresponding to a particular image size. The graphics controller is receives the frame. Preferably, the graphics controller is remote from the image data source and the host, and includes a fitting module for calculating a scale factor based on the image size, and a scaling unit for scaling the image according to the scale factor. In another preferred embodiment, a system includes a display device of a particular resolution, a memory, and a graphics controller. The memory is for storing a frame corresponding to a particular image size. The graphics controller preferably includes: a fitting module for calculating a scale factor based on the image size and the display device resolution, and a scaling unit for scaling the image according to the scale factor. The graphics controller may be adapted for retrieving the display device resolution from the display device. Preferred embodiments prevent the host from being repeatedly interrupted each time a new frame needs to be stored or written to the display device thereby improving host and system efficiency.

10 Claims, 1 Drawing Sheet

EFFICIENT SCALING OF IMAGE DATA IN GRAPHICS DISPLAY SYSTEMS

FIELD OF THE INVENTION

The present invention relates generally to methods and apparatus for efficient scaling of image data in graphics display systems.

BACKGROUND

Mobile devices commonly have graphics display systems that includes a host, a camera, a display device, and a graphics controller. The graphics controller drives the display device and interfaces the host and the camera with the display device. The graphics controller commonly includes an embedded memory for storing image data and logic for performing various image processing operations. The display device may render static or video image data. A mobile device may be, for example, a mobile telephone, personal digital assistant, digital camera, or digital music player. Mobile devices typically rely primarily on a battery for power. To maximize battery life in these devices, it is important to minimize power consumption. It is also important to minimize the size of the memory, which reduces cost and also reduces power requirements.

In graphics display systems, it is frequently necessary to change the size and dimensions of images. For example, it may be necessary to reduce the size of an image so that it will fit into the memory. In addition, it may be necessary to increase the height or width of an image so that it will fill a display window. In mobile devices, the graphics controller often performs the image scaling operations. When an image scaling operation is desired, the graphics controller may be provided with image data, one or more scaling parameters, and a command to scale the image.

Typically, the host determines when an image scaling operation is desired, calculates the scaling parameter(s), and issues the command to the graphics controller. Mobile devices are increasingly being used to display video image data. A camera in the mobile device or another source, such as a component providing a television broadcast input, may provide video image data to the graphics controller. Video image data are provided at regular intervals, for example, 20 frames per second. For each video frame, the host recognizes when a new frame in the video stream needs to be scaled, calculates the scaling parameter(s), and issues the appropriate scaling command to the graphics controller. However, the host in a mobile device, such as a mobile telephone, can be quite busy with processing tasks associated with communications functions. Interrupting the host each time a new frame is received or needs to be written to the display so that the host can calculate a scaling parameter and issue a command to the graphics controller can be extremely burdensome for the host.

Accordingly, methods and apparatus for efficient scaling of image data in graphics display systems would be desirable.

SUMMARY

The invention is directed to systems and apparatus for efficient scaling of image data in graphics display systems.

A preferred embodiment is directed to a system having a host, an image data source, and a graphics controller. The image data source is for providing a frame of pixels corresponding to an image of a particular image size. The graphics controller is for receiving the frame from the image data source. Preferably, the graphics controller is remote from the image data source and the host, and includes: (a) a fitting module for calculating a scale factor based on the image size, and (b) a scaling unit for scaling the image according to the scale factor. Preferably, the host for is adapted for providing at least one parameter specifying the image size.

Another preferred embodiment is directed to a system having a display device of a particular resolution, a memory, and a graphics controller. The memory is for storing a frame of pixels corresponding to an image of a particular image size. The graphics controller preferably includes (a) a fitting module for calculating a scale factor based on the image size and the display device resolution, and (b) a scaling unit for scaling the image according to the scale factor. In addition, the graphics controller is preferably adapted for retrieving the display device resolution from the display device.

Yet another preferred embodiment is directed to a graphics controller for interfacing a host and an image data source. The graphics controller includes (a) a memory for storing a frame of pixels corresponding to an image of a particular image size, (b) a fitting module for calculating a scale factor based on the image size, and (c) a scaling unit for scaling the image according to the scale factor. The graphics controller is remote from the image data source and the host. Preferably, the fitting module is adapted for receiving the image size parameter from the host. In addition, the fitting module is preferably adapted in an alternative embodiment for retrieving the image size parameter from the image data source.

The objectives, features, and advantages of the invention will be more readily understood upon consideration of the following detailed description of the invention, taken in conjunction with the accompanying drawings.

DETAILED DESCRIPTION OF PREFERRED EMBODIMENTS

Figure 1:
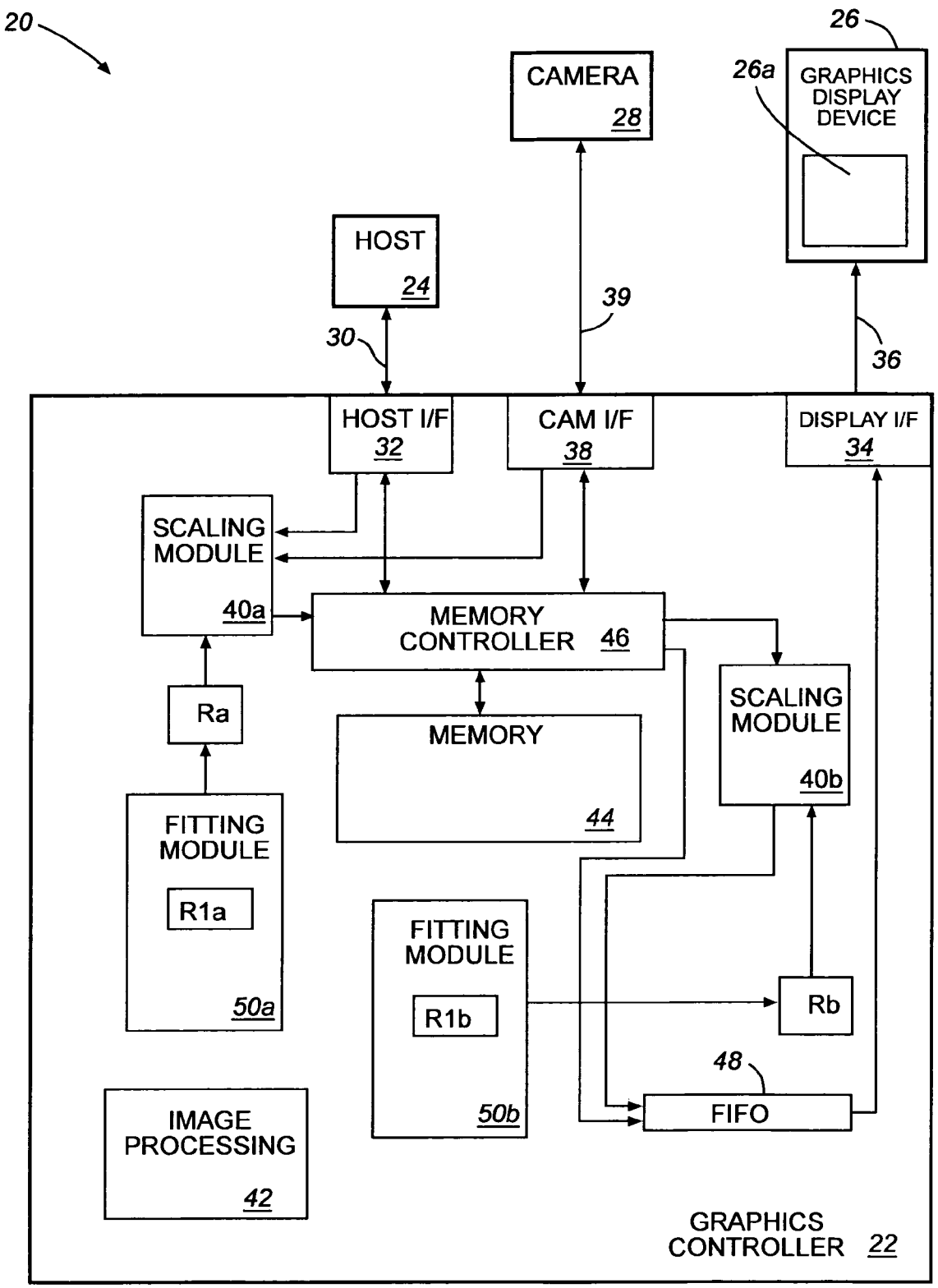
FIG. 1 is a block diagram of a graphics display system according to a preferred embodiment of the invention.

The invention is directed to methods and apparatus for efficient scaling of image data in graphics display systems. Reference will now be made in detail to the present preferred embodiments of the invention, examples of which are illustrated in the accompanying drawings. Wherever possible, the same reference numbers are used in the drawings and the description to refer to the same or like parts.

The image on a display screen is formed from an array of small discrete elements ("pixels.") The attributes of each pixel, such as its brightness and color, are represented by a numeric value, which is typically represented in binary form. Thus, an image can also be considered as an array of binary elements of data. For convenience of explanation and in accordance with the use of the term in the art, the term pixel is used herein to refer at times to the display elements of a display device, at times to the binary elements of data that are stored and manipulated within a graphics display system and which define the attributes of such display elements, and at times to both, the appropriate sense of the term being clear from the context.

Pixels in a display device are generally updated or "refreshed" according to a raster scan pattern, that is, from side to side in lines from top to bottom. In addition, pixels are commonly stored in memory, fetched from memory, and written to the display device in raster order.

A frame of image data ("frame") is a two dimensional matrix of pixels. In this specification, a frame has "p" rows and "q" columns of pixels, and a frame has (p·q) pixels.

Frames are stored in memory and written to a display device. Like a frame, a memory is physically organized into a two dimensional matrix of rows and columns. A location for storing a bit is provided at the intersection of each row and column. Typically, a pixel is defined by a plurality of bits, such as 8, 16, or 24 bits. Thus, a single pixel is stored in a plurality of physical memory locations. A memory may be viewed as a logical matrix of rows and columns, where the intersection of each logical row and column provides a location for storing a pixel. The number of rows and columns in the logical matrix depends on the number of bits needed to define a pixel. In this specification, a memory for storing a frame is viewed logically as having "m" rows and "n" columns, defining (m·n) pixel storage locations. Similarly, the display area (or resolution) of display device organized into "x" rows and "y" columns, defining (x·y) pixel display locations.

The scaling of an image may be performed both horizontally and vertically. Alternatively, scaling may be "homogeneous," i.e., the scaling is the same in both the horizontal and vertical dimensions. Accordingly, a scaling operation may be specified by horizontal and vertical scale factors, or a single scale factor. In this specification, a horizontal scale factor $S_H$ and a vertical scale factor is denoted $S_V$. Horizontal and vertical scale factors may be derived from a single scale factor S, such as $S = S_V \cdot S_H$. For homogeneous scaling, $S_V = S_H = \sqrt{S}$. Scale factors may be used for up-scaling or down-scaling an image.

When an image is scaled, it is transformed from an "original size" to a "scaled size." The terms "original size" and "scaled size" can refer to the same image depending on the context. In one preferred context, an image is provided to a graphics controller by an image source, such as a camera, a host, or a television input module. According to preferred embodiments of the invention, the image provided by the source is down-scaled for storing in the memory in the graphics controller. The "original size" is the size of the image presented to the graphics controller, and the "scaled size" is the size of the memory, or the size of the portion of the memory allocated for storing images or frames. In addition, according to preferred embodiments of the invention, the image stored in the memory is subsequently up-scaled for writing to a display device. Therefore, when the image stored in the memory is up-scaled, the "original size" of the image is now the size of the image as stored in the memory, and the "scaled size" is now the size of the display screen of the display device. It will be appreciated that the use of the terms "original size" and "scaled size" in a particular example or with respect to a particular embodiment is not intended to limit the scope of the invention.

In general, a scale factor may be derived from the ratio of the "scaled size" of an image (or image dimension) to the "original size" of the image (or image dimension). Where an image is to be homogeneously down-scaled from an original size (p·q) to a scaled size for storing the image in a memory having a particular memory size, i.e., to a memory size (m·n), the scale factor $S_a$ is:

$$S_a = \frac{(m \cdot n)}{(p \cdot q)}$$

implying corresponding horizontal and vertical scale factors of:

$$S_{a-H} = S_{a-V} = \sqrt{\frac{(m \cdot n)}{(p \cdot q)}}$$

Where an image stored in a memory is to be fetched from the memory and up-scaled for writing to a display device (so as to fill the display screen), the original size of the image is defined by the size of the memory, i.e., (m·n), the scaled size is defined by the display screen size, i.e., (x·y), and the scale factor $S_b$ is:

$$S_b = \frac{(x \cdot y)}{(m \cdot n)}$$

However, for the purpose of fitting an image to the display, it is often desirable to specify independently variable horizontal and vertical scale factors. Accordingly, the original size of the vertical dimension is n, and the scaled size of the vertical dimension is y. Similarly, the original size of the horizontal dimension is m, and the scaled size of the horizontal dimensions is x. Thus, the horizontal and vertical scaling factors are:

$$S_{b-v} = \left(\frac{y}{n}\right)$$

$$S_{b-h} = \left(\frac{x}{m}\right)$$

The host in a graphics display system may calculate and write the scale factor(s) to the graphics controller when it is desired to scale an image. To calculate the scale factor(s) for storing an image in the memory, the host must determine the image size (p·q), and the memory size (m·n). To calculate the scale factor(s) for writing an image stored in the memory to the display device, the host must determine at least the image size (p·q), which is the memory size (m·n), and the display resolution or size (x·y).

The host may determine the size of an original image (p·q) provided to the graphics controller for scaling and then storing in the memory in several ways. If the host itself provides the image, then the host "knows" the image size. If another image source, such as a camera provides the image, the size of the image generally depends on how the image provider is programmed. Typically, the camera may be programmed in a plurality of modes of resolution. Since the host typically programs the camera, either directly or via the graphics controller 22, the host "knows" the size of camera images. Additionally, image sources, such as the camera typically "know" the size of images they produce, and the host may query the source device to learn the image size.

The may host determine the memory size (m·n) by issuing a query to the graphics controller. Typically, the graphics controller "knows" the size of its internal memory or the size of the portion of the internal memory allocated for storing the image.

The host may determine the display resolution (x·y) by issuing a query to the display device. Typically, the display device "knows" the resolution of its display screen.

After having obtained the necessary or desired parameters, the host may compute and write the scale factor(s) to the graphics controller along with a command to scale the image. In graphics display systems, it may frequently be necessary for the host to compute and write scale factor(s) to the graphics controller. This is especially true where the memory in a graphics controller is made as small as possible, consistent with the goals of reducing cost and power requirements in mobile devices. In addition, scaling is common where a stream of video frames is rendered in the graphics display system. It can be a significant burden on the host to require it to repeatedly calculate and provide scaling parameters to the graphics controller each time an image scaling operation is needed. The graphics controller 22 according to a preferred embodiment of the invention substantially reduces the burden on the host.

FIG. 1 illustrates a graphics display system 20. The system is an exemplary context for preferred embodiments of the invention. The graphics display system 20 includes the graphics controller 22. The system 20 may be any digital system or appliance. Where the system 20 is a portable digital appliance, it is typically powered by a battery (not shown). The system 20 typically includes a host 24, a graphics display device 26, and a camera module 28. The graphics controller 22 drives the display device and interfaces the host and the camera module with the display device. Preferably, the graphics controller 22 is a separate IC from the remaining elements of the system, that is, the graphics controller is "remote" from the host, camera, and display device.

The host 24 is typically a microprocessor, but may be a digital signal processor, a computer, or any other type of controlling device adapted for controlling digital circuits. The host 24 communicates with the graphics controller 22 over a bus 30 to a host interface 32 in the graphics controller.

The graphics controller 22 includes a display device interface 34 for interfacing between the graphics controller and the display device 26 over display device bus 36. LCDs are typically used as display devices in portable digital appliance, such as mobile telephones, but any device(s) capable of rendering pixel data in visually perceivable form may be employed. The display device 26 has a display area 26a. In one embodiment, the display device 26 may be a printer. The graphics controller 22 also includes a camera interface 38 ("CAM I/F") for receiving pixel data output on data lines of a bus 39 from the camera 28.

The graphics controller 22 is adapted to perform various image processing operations. Such image processing operations may be performed by units included in an image processing block indicated generally as 42 in FIG. 1. The image processing block 42 may include, for example, a CODEC for compressing and decompressing image data, and a color converter for converting the color format of the data. Image processing operations, such as cropping, compression encoding, and color converting, may be performed as the data are received, "on the fly," or they may be performed on data that have been stored in a memory.

In a preferred embodiment, the graphics controller 22 includes a memory 44 for storing frames of image data. In other embodiments, however, the memory 44 may be remote from the graphics controller. The memory 44 is preferably an SRAM, however, any type of memory may be employed. Access to the memory 44 is controlled by a memory controller 46.

Typically, the image data stored in the memory 44 are fetched and transmitted through a display pipe 48, which is preferably a FIFO buffer. The output of the display pipe is passed through the display device interface 34 and display device bus 36 to the display device 26.

Preferably, the graphics controller 22 includes a scaling unit 40 having two scaling modules 40a and 40b, which are provided in the locations shown in FIG. 1. The scaling module 40a is provided on the input side of the memory 44. The scaling module 40a is preferably employed for receiving an original image from an image source and down-scaling the image for storing in the memory in the graphics controller. The scaling module 40b is provided on the output side of the memory 44, which is also the input side of the display device 14. The scaling module 40b is preferably employed for fetching or receiving the image stored in the memory 44 and up-scaling the image for writing the scaled image to the display device 26. In alternative embodiments, the scaling unit 40 includes only the scaling module 40a or the scaling module 40b.

Both of the scaling modules 40a, 40b may provide for down-scaling as well as up-scaling. For example, vertical down-scaling may replace two original rows with a single row derived from interpolation of the two original rows. Analogously, horizontal down-scaling may replace four original pixels with a single pixel derived from interpolation of the four original pixels.

Each of the scaling modules 40a, 40b has an associated register set "R" for storing one or more scaling factors to be used by the scaling module. A register set may provide, for example, for storing a single scale factor S, or a horizontal scale factor $S_H$ and a vertical scale factor $S_V$.

Fitting modules 50a, 50b are preferably associated with the scaling modules 40a, 40b for automatically providing the scaling modules with the required scale factor(s). The fitting module 50a provides the scale factor(s) in response to receiving from the host 24 only the original image size parameters. The fitting modules 50a, 50b include a memory, e.g., registers R1a, R1b, for storing the "original size" and the "scaled size" of an image or frame. The host 24 may write the size of an "original image" into the register R1a, which is typically the number (p·q), but may be any specification from which the same information can be derived.

Since the fitting modules 50a, 50b are part of the graphics controller 22, they are preferably hard-wired to receive the memory size (m·n) or an equivalent, which is stored in the register R1a as a "scaled size", and in the register R1b as an "original size." In an alternative embodiment, different portions of the memory may be allocated for storing image data at different times. In this case, the fitting modules 50 are adapted to learn the memory size (m·n) in any manner, such as by reference to a register (not shown) having the current memory size stored therein.

In an alternative embodiment, the fitting module 50a is adapted to query the camera 28 (or other image source) to obtain a specification for the camera resolution. This eliminates the need for the host 24 to write the size of an "original image" into the register R1a. In addition, the fitting module 50b may be adapted to query the display device 26 to obtain a specification for the display resolution. Alternatively, the host 24 may store the display resolution in the register R1b on one occasion only for use by the fitting module 50b for a plurality of scaling operations. For this reason, the host may not need not to query the camera or display device at all, or alternatively may only need to query these devices one time. Further, the fitting modules 50 are hard-wired or otherwise adapted to receive the memory size, so the host need not query the graphics display device to obtain the memory size. In addition, the fitting modules 50 are further adapted to compute the scale factor(s) according to the formulas provided above. The computed scale factor(s) are stored by the fitting modules in the registers Ra and Rb. This eliminates the need for the host to compute the scale factor(s). Thus, the host may attend to other processing tasks without having to receive and respond to interrupts. As one skilled in the art will appreciate, there can be a significant amount of overhead associated with switching context to process an interrupt, servicing the interrupt request, clearing the interrupt, and switching back to the previous context.

The scaling modules 40 and fitting modules 50 according to the invention are preferably implemented in hardware; however, it should be understood that they may be implemented in a combination of hardware and software, or in software, provided the graphics controller is suitably adapted. For example, a program of instructions embodied in a machine readable medium may be provided for execution by a machine in the graphics controller or included elsewhere in the graphics display system. The machine readable medium may be magnetic or optical disks, hard disk drives, memory chips of any type, and other similar memory devices. The program of instructions may be software, firmware, hardware code, or other similar program. The program of instructions, when executed by the machine, performs a method that includes querying devices for "original image" and "scaled image" sizes and performing scale factor computations.

The terms and expressions that have been employed in the foregoing specification are used as terms of description and not of limitation, and are not intended to exclude equivalents of the features shown and described or portions of them. The scope of the invention is defined and limited only by the claims that follow.

We claim:

1. A graphics display system, comprising:
a host to provide at least one parameter specifying an image size of a frame of pixels corresponding to an original image;
an image data source to provide the original image; and
a graphics controller to receive the frame corresponding with the original image from the image data source, the graphics controller being remote from the image data source and the host, and including:
(a) a memory of a particular size to store a scaled frame;
(b) a register to store the size of a portion of the memory allocated to store the scaled frame;
(c) a fitting module to receive the at least one image size parameter from the host and to calculate a scale factor based on the original image size and the size of the portion of the memory allocated to store the scaled frame, wherein the register is only accessible by the fitting module, and
(d) a scaling unit to scale the original image according to the scale factor.

2. The system of claim 1, wherein the portion of the memory allocated to store the scaled frame is one of at least two different sizes.

3. The system of claim 1, wherein the scaling unit downscales the image for storing in the memory.

4. The system of claim 1, wherein the host and the image data source are remote from each other.

5. The system of claim 1, wherein the image data source is a camera.

6. The system of claim 1, wherein the fitting module is additionally to issue a query to and receive from the image data source the at least one image size parameter.

7. A graphics controller for interfacing a host and an image data source, comprising:
(a) a memory having allocable memory capacity to store a scaled frame of pixels;
(b) a register to store an original image size parameter, the original image size parameter corresponding with an original image;
(c) a register to store a scaled image size parameter;
(d) a fitting module to calculate a scale factor based on the original image size parameter and the scaled image size parameter; and
(e) a scaling unit to scale the original image according to the scale factor, wherein the graphics controller is remote from the image data source and the host, and wherein the scaled image size parameter corresponds with the size of the portion of the memory allocated to the scaled frame.

8. The graphics controller of claim 7, wherein the fitting module is additionally to issue a query to the host and to receive from the host the original image size parameter.

9. The graphics controller of claim 7, wherein the fitting module is additionally to issue a query to the image data source and to receive from the image data source the original image size parameter.

10. The graphics controller of claim 7, wherein the fitting module is additionally to determine the size of the portion of the memory allocated to store a frame and thereby determine the scaled image size parameter.

* * * * *